Dec. 19, 1961     D. A. WALTHER     3,013,841
CLAMPING DEVICES FOR RIM AND WHEEL ASSEMBLIES
Filed May 22, 1959     2 Sheets-Sheet 2
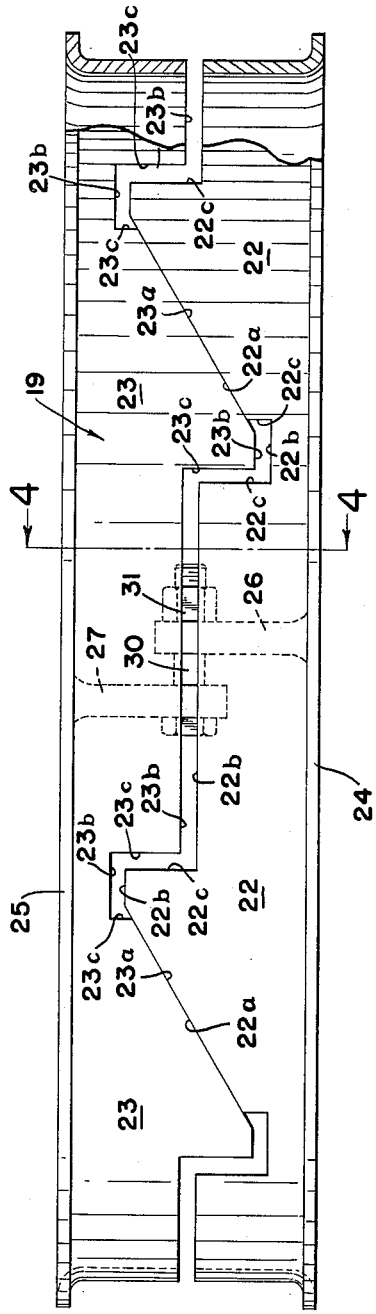
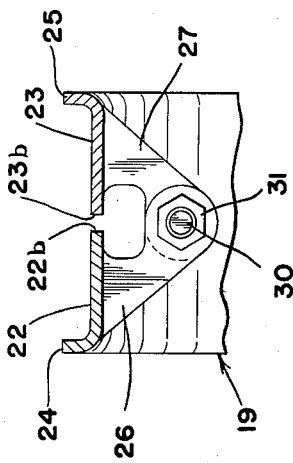
INVENTOR
DANIEL A. WALTHER
BY
ATTORNEYS

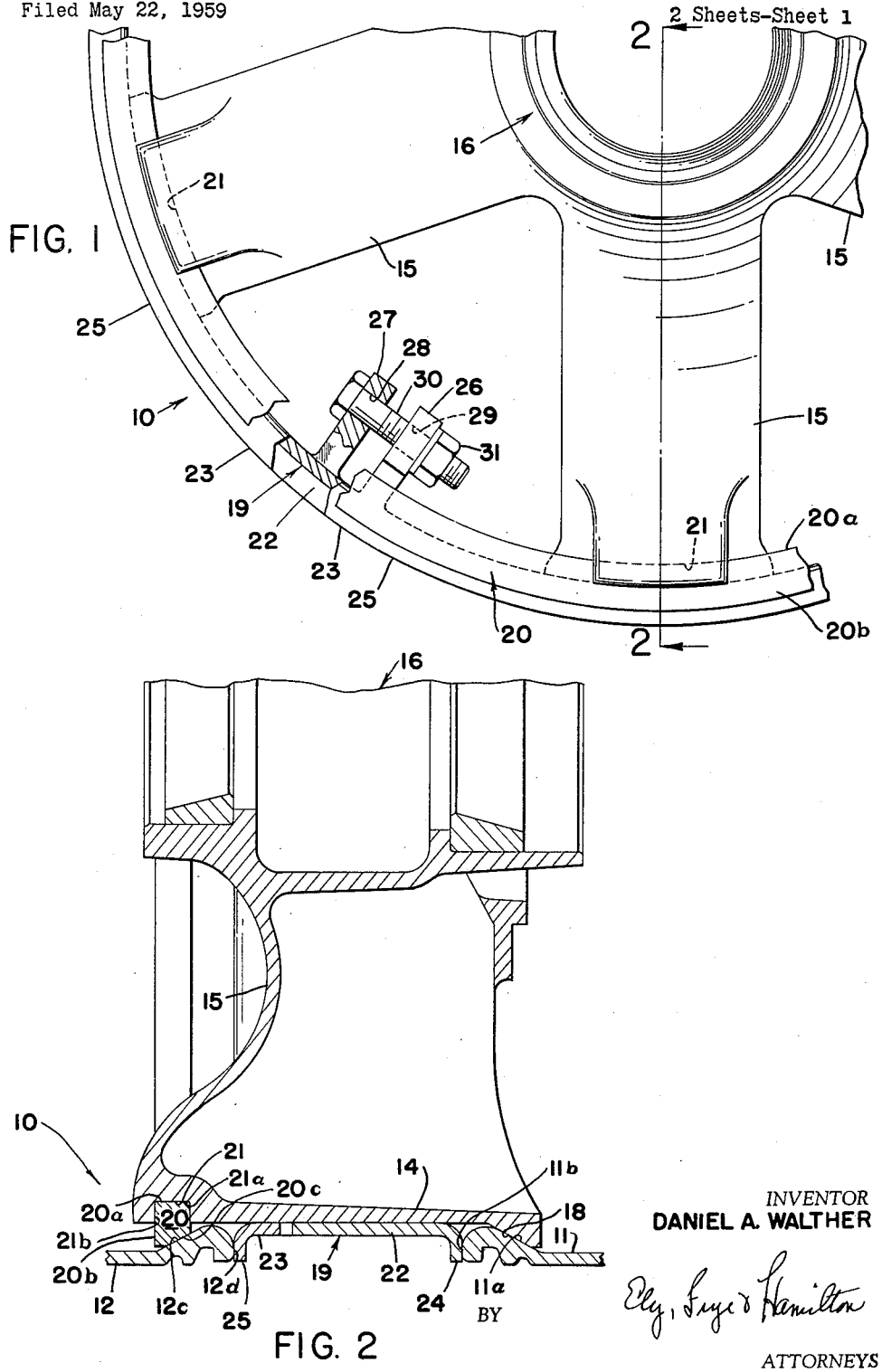

United States Patent Office 3,013,841
Patented Dec. 19, 1961

3,013,841
CLAMPING DEVICES FOR RIM AND
WHEEL ASSEMBLIES
Daniel A. Walther, Dayton, Ohio, assignor to The Dayton Steel Foundry Company, Dayton, Ohio, a corporation of Ohio
Filed May 22, 1959, Ser. No. 815,215
5 Claims. (Cl. 301—13)

The present invention relates generally to clamping devices for rim and wheel assemblies. More particularly, the invention relates to an improved clamping device whereby dual rims, as used on vehicles such as trucks, tractors and trailers, may be demountably secured to a wheel.

A conventional dual rim assembly for a vehicle includes the wheel attached to the vehicle axle, an inner rim carried on the wheel, a spacer band, extension or separating means to provide clearance for the dual tires, an outer rim and clamping devices or fastening means securing the several elements of the assembly to the wheel. The prior art has seen countless types and forms of single and dual rim assemblies; with many and varied concepts of spacer bands and fastening means employed therewith. The present invention is concerned with a novel and effective form of clamping device in the form of an improved and adjustable spacer band for securing a dual rim assembly to a wheel.

In the past, clamping devices or fastening means for dual rim assemblies have been according to at least three different concepts. In what is probably one of the earliest types, an inner rim was mounted on the brake drum of the wheel and secured by a wedge means and a series of fastening bolts. The outer rim was mounted on the wheel itself, separated from the brake drum by a suitable extension, and also secured by wedge means and fastening bolts. This type of mounting had the disadvantage that two distinct sets of fastening means were required and those for the inner rim were inaccessible from the outside of the wheel. This type may be seen, for example, in U.S. Patent No. 1,544,297.

The next or second type of clamping device overcame the disadvantage of the earlier types by providing fastening means for both the inner and outer rims which were equally accessible from the outside of the wheel. Several forms of this type were developed, but generally speaking, each assembly included an inner rim held in position on the wheel felly by a separator element or spacer band. Positive means such as bolts on the outer face of the wheel maintained the spacer band in position. The outer rim was maintained in position by a wedge means such as a ring or a plate which cooperatively engaged an extension of the spacer band and was secured by clamping lugs and bolts alternately spaced with the inner rim bolts. The principal objection to these types of clamping devices is their high initial cost, complexity and cost of maintenance. This type may be seen, for example, in U.S. Patent No. 1,838,050.

By far, the least expensive, both from the standpoint of initial cost and subsequent maintenance, is the type of clamping device employing a spacer band between the rims and a common means for simultaneously securing both rims in position. As noted above, the art has tended toward complex types of clamping devices. One can only speculate as to the reasons. Nevertheless, the present invention has been developed because the inner rim-spacer band-outer rim, with common fastening means type of assembly, is considered to have important commercial advantages.

It is, therefore, an object of the present invention to provide an improved form of dual rim assembly. Further, it is an object to provide an improved from of inner rim-spacer band-outer rim, with common fastening means type of dual rim assembly.

Specifically, it is an object of the invention to provide an improved from of spacer band, incorporating in the construction thereof a novel concept whereby the axial width of the spacer band may be selectively changed, to secure inner and outer rims in operative condition on a wheel, while maintaining a substantially constant diameter in relation to the wheel.

These and other objects and advantages of the invention will become apparent in view of the following detailed description and the attached drawings.

In the drawings:

FIG. 1 is a partial side elevation of a dual rim assembly in operative condition on a wheel.

FIG. 2 is a sectional view through the assembly shown in FIG. 1, taken substantially on line 2—2 of FIG. 1.

FIG. 3 is a plan view of the novel spacer band according to the invention; and

FIG. 4 is a partial elevation of the spacer band taken substantially on the line 4—4 of FIG. 3.

In general, an improved clamping device according to the invention comprises a spacer band or ring, which may be axially expanded while maintaining a substantially constant diameter, mounted on the felly surface of a wheel between an inner and an outer rim and an annular holding member received in a specially contoured or shaped groove on the felly surface of the wheel axially outwardly of the outer rim. The holding ring, which is preferably split, secures the outer rim to the wheel. The spacer band or ring cooperates with the annular ring and, when expanded, secures the dual rims in operative condition on a vehicle wheel.

Referring to the drawings, the rim clamping devices, referred to generally by the numeral 10, are installed to secure an inner rim 11 and an interchangeable outer rim 12 in operative condition on the felly 14 of a wheel having any desired number of spokes 15 and a conventional hub area 16. An inclined mounting flange 11a of the conventional inner rim is slidably seated on and carried by a standard 28° radially beveled rim mounting surface 18 on the axia'ly inner portion of the wheel felly 14. The rim clamping device 10 includes an expandable spacer band indicated at 19, and an annular member or ring indicated at 20.

As shown in FIG. 2, the annular ring 20 is seated in a shaped groove 21 on the axially outer portion of felly 14. The ring 20 is split and so fabricated that when placed in groove 21 it tends to clamp itself therein; i.e., ring 20 normally has an inner diameter smaller than the outer diameter of surface 21a and the radially inner surface 20a of ring 20 will flex against the circumferential surface 21a of groove 21 and thereby hold itself in this position irrespective of the application of external forces. This is the preferred form for ring 20, but it might also be secured in operative position by other suitable means, as by bolting.

The surface 21b, which defines the axially outer surface of groove or notch 21, is formed so that it is substantially perpendicular to the rotational axis of the wheel. The axially outer surface 20b of ring 20 conforms with surface 21b which provides a uniform axially exterior stop plane beyond which the assembly cannot move. Because of the fixed position of ring 20, should some structural failure occur to the tightening means hereinafter described, the assembly would not fall apart; thereby providing a safety factor, as is required by I.C.C. regulations for truck operation, which would permit the driver to effect a safe stop in the event of such structural failure. Ring 20 also has an axially inner radially outer corner surface 20c which has a standard 28° radial bevel for seating and carrying an inclined mounting flange 12c of the conventional outer rim 12.

Referring now to FIGS. 2 and 3, the spacer band or ring 19 is annularly divided into two segments 22 and 23. These two segments slidably fit over the radially outer surface of felly 14. As oriented in the drawings, though the segments may be reversed and operated in an identical manner, segment 22 is designated the axially inner segment and segment 23 is designated the axially outer segment. The axially inner edge of segment 22 terminates in a lip 24 which is provided to engage the axially outer flange face 11b of inner rim 11. The axially outer edge of segment 23 is similarly provided with lip 25 to engage the axially inner flange face 12d of outer rim 12.

As best shown in FIG. 3, the medial division of spacer ring 19 has a series of angularly mating slidably wedging surfaces, which are opposed or in juxtaposition and firmly in contact when the spacer is positioned to secure the rims in operative position, alternating with surfaces which do not contact an opposed surface when the spacer is positioned to secure the rims in operative position.

In more detail, the surfaces 22a on segment 22 mate with surfaces 23a on segment 23. Surfaces 22a and 23a are helicoidal and angularly disposed in the circumferential plane lying perpendicular to the axis of rotation—shown as approximately 30°. This angle is not critical, but must be such that the axial width of the spacer ring 19 can be increased by rotating the identical opposed segments 22 and 23 without disproportionate stress in the tightening means. In effect, these helicoidal surfaces act as an inclined plane effectively operating in the cylindrical plane of the spacer ring 19.

The exact shape or form of the surfaces alternating between the slidably wedging surfaces is not critical; they merely serve to allow the angularly mating, helicoidal wedging surfaces to remain substantially in the central portion of the split spacer. This purpose could have as easily been accomplished by a saw-tooth arrangement (not shown), but was here depicted as being a series of surfaces 22b on sergment 22 and 23b on segment 23 which lie in planes perpendicular to the axis of rotation and surfaces 22c on segment 22 and 23c on segment 23 which lie transverse the planes of surfaces 22b and 23b.

The tightening means is best shown in FIGS. 1, 3 and 4. Preferably, similarly formed lugs 26 and 27 are attached to spacer ring segments 22 and 23, respectively, and project radially inwardly. The lugs 26 and 27 are normally spaced apart and have registering holes 28 and 29, respectively, to accommodate a tightening means. As shown, the tightening means comprises a threaded bolt 30 and nut 31. This is illustrative only and other forms of tightening means, such as a bolt threaded on opposite ends and mating with threads in holes 28 and 29, could be employed to rotate the segments 20 and 21 and thereby assemble a dual rim assembly in operative condition on a wheel.

In conclusion, the above described invention particularly relates to an improved dual rim assembly in which the inner rim 11, with a tire thereon, may be placed on the wheel and mounted on the felly flange 18. The expandable spacer 19, adjusted to minimum or near minimum axial dimension, is then mounted in contact with the inner rim 11. The outer rim 12, with a tire thereon, is then slipped over the wheel and brought in contact with spacer ring 19. Ring 20 is then snapped into groove 21 and the tightening nut 31 is turned on bolt 30 rotating the segments 22 and 23 in opposite directions about the surface of the felly 14 and bringing the opposed helicoidal surfaces 22a and 23a together, resulting in an increase of the axial dimension or width of the spacer ring 19, thereby clamping the assembly in operative condition on the wheel by maintaining the spacer ring 19 in a predetermined axial dimension.

What is claimed is:

1. In combination, a wheel having a felly for mounting a rim clamping device, inner and outer rims mounted on said felly, a notch on the axially outer surface of said felly, said clamping device including a ring positioned within said notch and extending radially outward from the mounting surface of said felly, and a spacer band annularly divided into two segments, said segments having mating helicoidal surfaces, means whereby said segments are rotated circumferentially in opposite directions and maintained in a predetermined minimum axial dimension, said helicoidal surfaces interacting to increase the axial width of said spacer band when said segments are rotated to secure said rims.

2. In combination, a wheel having a felly for mounting a rim clamping device, inner and outer rims mounted on said felly, a notch on the axially outer surface of said felly, the axially outer surface of said notch being substantially perpendicular to the rotational axis of the wheel, said clamping device including a ring, the axially outer surface of said ring conforming with the axially outer surface of said notch wherein said ring is positioned, said ring when positioned extending radially outward from the mounting surface of said felly, and a spacer band annularly divided into two segments, said segments having mating helicoidal surfaces, means whereby said segments are rotated circumferentially in opposite directions and maintained in a predetermined minimum axial dimension, said helicoidal surfaces thereby interacting to increase the axial width of said spacer band when said segments are rotated to secure said rims.

3. In combination, a wheel having a felly for mounting a rim clamping device, inner and outer rims mounted on said felly, a notch on the axially outer surface of said felly, the axially outer surface of said notch being substantially perpendicular to the rotational axis of the wheel, said clamping device including a ring, the axially outer surface of said ring conforming with the axially outer surface of said notch wherein said ring is position, said ring when position extending radially outward from the mounting surface of said felly, and a spacer band annularly divided into two segments, said segments having mating helicoidal surfaces, a lug attached to each segment and projecting radially inward from said segment, a hole in each of said lugs, said holes in register, tightening and maintaining means accommodated in said holes, the tightening of said means rotating said segments circumferentially in opposite directions, said helicoidal surfaces thereby interacting to increase the axial width of said spacer band and said means maintaining a predetermined minimum axial dimension to secure said rims.

4. The combination according to claim 3 in which the ring is split and which has the inherent quality of flexing toward its normal diameter.

5. In combination, a wheel having a felly, a beveled rim mounting surface at the axially inner portion of said felly, a first rim on said axially inner mounting surface, a beveled rim mounting means removably secured at the axially outer portion of said felly, a second rim on said axially outer mounting means, and a spacer band on said felly between said first and second rims, said spacer band being annularly divided into two segments, said segments having mating helicoidal surfaces, and having means whereby said segments are rotated circumferentially in opposite directions and maintained in a predetermined axial dimension, said helicoidal surfaces interacting to increase the axial width of said spacer band when said segments are rotated to secure said rims.

(References on following page)

References Cited in the file of this patent

UNITED STATES PATENTS

| | | |
|---|---|---|
| 877,726 | Nordlund | Jan. 28, 1908 |
| 1,151,086 | Cole | Aug. 24, 1915 |
| 1,735,290 | Meyer et al. | Nov. 12, 1929 |
| 1,862,218 | Handy | June 7, 1932 |
| 1,966,780 | Wyrick | July 17, 1934 |
| 2,024,264 | Zipper et al. | Dec. 17, 1935 |
| 2,270,919 | Ash | Jan. 27, 1942 |

FOREIGN PATENTS

| | | |
|---|---|---|
| 400,230 | France | May 25, 1909 |
| 505,052 | Germany | Aug. 13, 1930 |

UNITED STATES PATENT OFFICE

CERTIFICATE OF CORRECTION

Patent No. 3,013,841  December 19, 1961

Daniel A. Walther

It is hereby certified that error appears in the above numbered patent requiring correction and that the said Letters Patent should read as corrected below.

Column 2, lines 1 and 5, for "from", each occurrence, read -- form --; column 3, line 42, for "sergment" read -- segment --; column 4, lines 42 and 43, for "position", each occurrence, read -- positioned --.

Signed and sealed this 10th day of July 1962.

(SEAL)
Attest:

ERNEST W. SWIDER
Attesting Officer

DAVID L. LADD
Commissioner of Patents